(No Model.)  2 Sheets—Sheet 1.

M. AVRAMOVITZ.
TRAP.

No. 562,879.  Patented June 30, 1896.

Witnesses
G. R. Fitch
J. C. Macdonald

Inventor
Max Avramovitz

By his Attorney
Jacob Felbel (No Model.) M. AVRAMOVITZ. TRAP.

2 Sheets—Sheet 2.

No. 562,879. Patented June 30, 1896.

Witnesses
C. R. Fitch
J. C. Macdonald

Inventor
Max Avramovitz
By his Attorney
Jacob Felbel

UNITED STATES PATENT OFFICE.

MAX AVRAMOVITZ, OF NEW YORK, N. Y.

TRAP.

SPECIFICATION forming part of Letters Patent No. 562,879, dated June 30, 1896.

Application filed January 21, 1895. Serial No. 535,586. (No model.)

*To all whom it may concern:*

Be it known that I, MAX AVRAMOVITZ, a citizen of the United States, and a resident of New York, in the county of New York and State of New York, have invented certain new and useful Improvements in Traps, of which the following is a specification.

The object of my invention is to provide a simple and effective mouse or rat trap.

Figure 1:
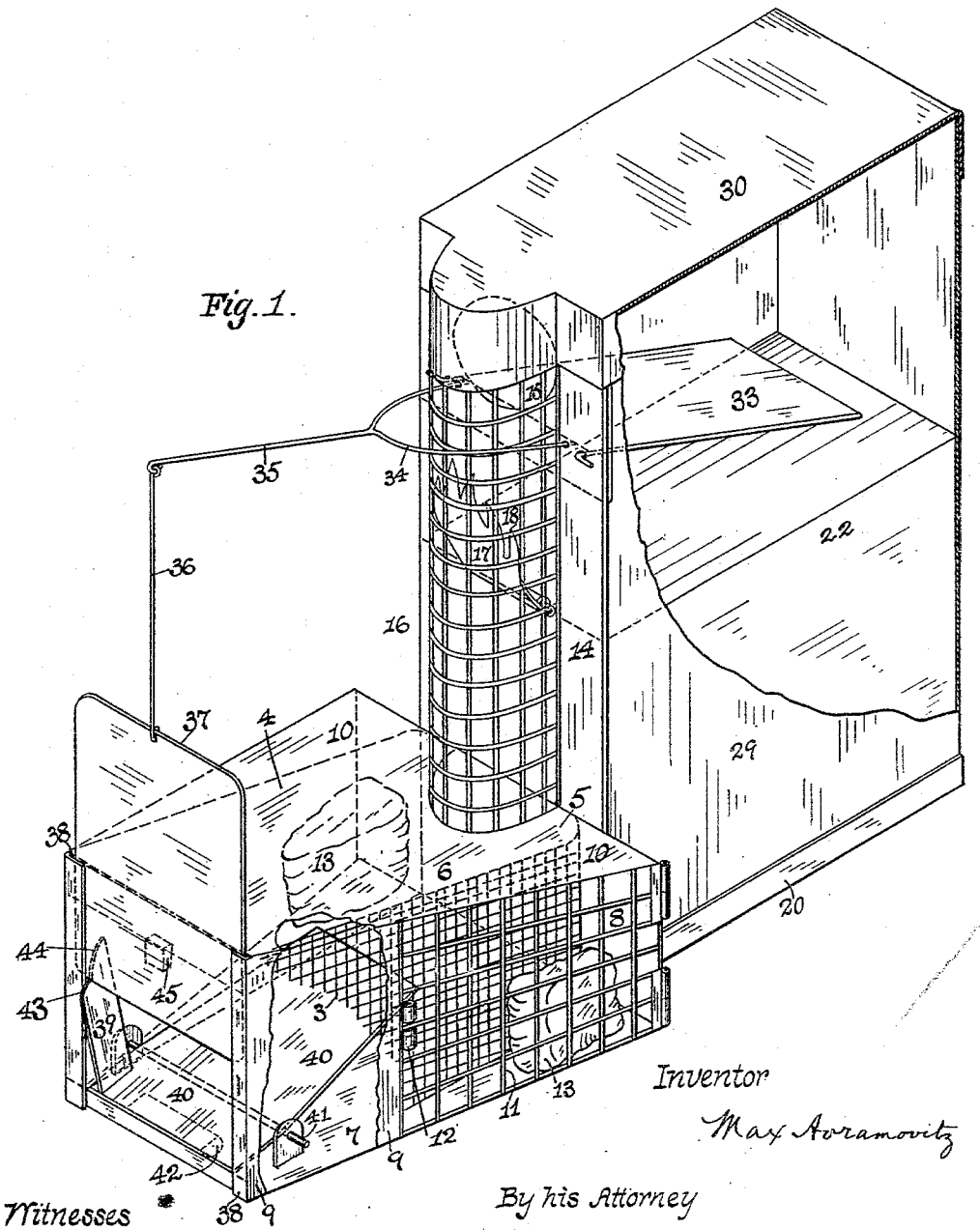
Figure 2:
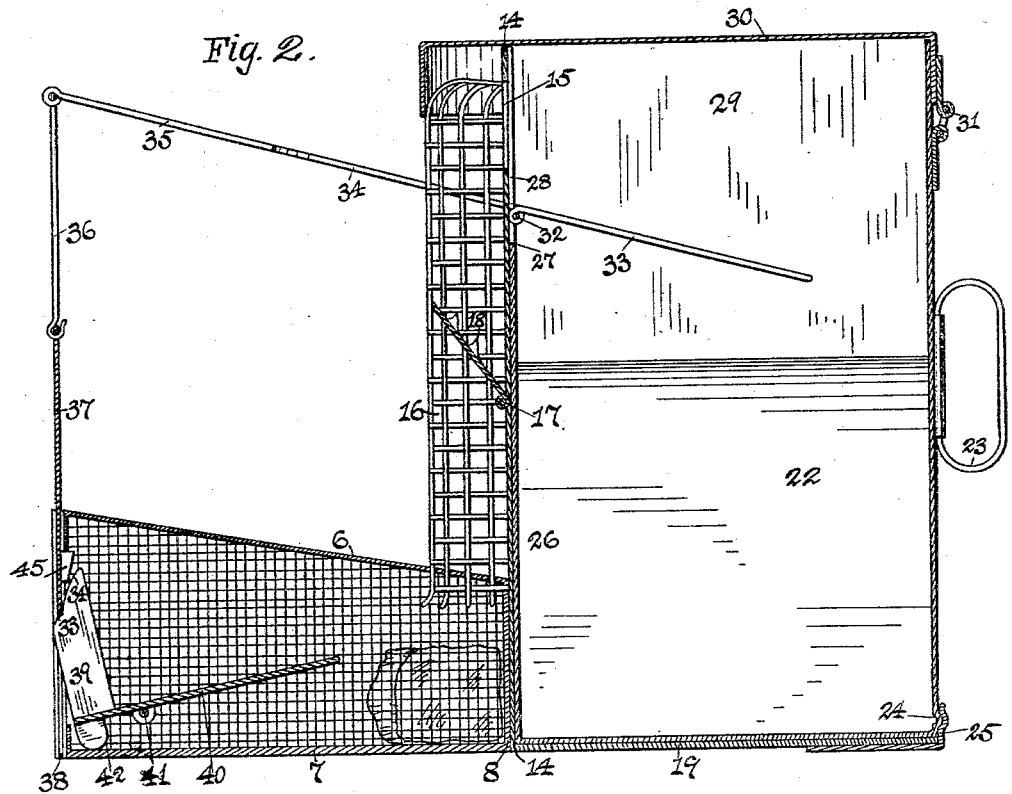

In the accompanying drawings, Figure 1 is a perspective view of a trap for rats and mice embodying my improvements, and Fig. 2 is a central vertical section of the same.

In both views the same parts will be found designated by the same numerals of reference.

In carrying out my invention, I provide a box or compartment, closed at its sides and rear and provided at its front with an entrance, which is controlled by a vertical sliding door. At each side of the box or compartment, but arranged exteriorly thereof, is a closed chamber adapted to contain the bait. Communicating with the top of the box is a vertical passage-way, which at its upper end opens into the upper end of a vessel adapted to be partially filled with water. Beneath said opening in the vessel and overhanging the water is a pivoted platform, upon which the animal passes on entering said vessel, and which immediately descends under the weight of the animal and drops him into the water below. This platform is connected to the sliding door in such a manner as that when the platform descends the door is elevated, so as to open the trap for the next animal. At the entrance of the box is a contrivance for holding the door raised, which contrivance is actuated by the animal itself in one direction and by gravity in the other. As the animal enters it steps upon a pivoted plate or lever, which carries at its forward end the means for holding up the door. The weight of the animal depresses this plate or lever and swings the prop or holding means for the door inwardly, whereupon the door will descend at once by gravity and prevent the exit of the animal at the door. Owing to the connection between the door and the platform, as the door descends the platform is elevated and held in position to receive the animal as he emerges through the opening leading to the vessel. The vertical passageway communicating with the vessel is provided with a gravity catch or obstruction, which permits the animal to pass up onto the platform, but which prevents its return to the box.

My improvements consist in the various features of construction and combinations of devices hereinafter more fully described, and particularly pointed out in the appended claims.

1 designates the box or compartment, which may be made of tin, sheet-iron, or some other suitable material. Within the box is arranged a piece of wire-gauze 2, which is bent or formed to constitute the sides of the box and the rear end of the box, the sides being designated by the numerals 3 and 4 and the rear end by the numeral 5. The top and bottom of the box, made of solid metal, are marked, respectively, 6 and 7, and joining these two members is a solid back plate or wall 8. Joining the top and bottom plates on each side near the front is a solid portion 9, (broken away at Fig. 1 to show the interior,) which portions are arranged exterior to the front portions of the wire-gauze 2 and with the back plate 8 serve to give rigidity to the top and bottom of the box.

The top and bottom plates taper outwardly rearwardly, and hence the box is smaller at its front end, and the rear side portions of the top and bottom protrude beyond the rear side portion of the interior wire-gauze on each side of the box and form thereby the top and bottom of the bait-chamber 10, the back of which is formed by extending outwardly the back plate 8. The front portion of each side of the wire-gauze runs alongside of and in contact with the solid side portion 9. Hinged to the back plate is a door 11, also made of wire-gauze, but of coarser mesh, and the forward end of this door is provided with a catch 12, by which the door is held closed. Owing to the described construction the bait-chamber is triangular in horizontal section. I have indicated at 13 the bait in said chamber.

Attached to the back plate 8 is an upright member 14, which at its upper end is provided with an opening 15. Secured to this upright member or wall is a vertical passageway, as 16, composed preferably of wire-gauze, which is closed at its top above said opening 15 and protrudes through the top 6 of the box into the interior thereof, where it is open. At a suitable point within said passage-way is pivoted at 17 a plate or tongue, having sharp prongs or spurs 18. The weight of this plate causes it to lie normally across the passage-way, as indicated in the drawings.

Attached to or formed integral with the front wall or member 14 is a horizontal bed or supporting plate 19, having upturned flanges 20 on its sides. Upon this bed-plate rests a vessel 21, adapted to contain water, (indicated at 22,) and provided with a handle or handles 23 on its back. The vessel may be provided with any suitable catch to hold it in place upon the bed-plate. I have shown the back of the vessel provided with a bead 24 and the back of the bed-plate provided with a spring-tongue 25, which devices serve sufficiently well to hold the vessel in position. The front wall 26 of the vessel does not extend up beyond the point 27, thus leaving an opening 28 between the sides 29 of the vessel coinciding with the opening 15, though preferably somewhat larger in size. The top of the vessel is provided with a cover 30, which is hinged at 31 upon the back of the vessel, and the front portion of the cover preferably extends over to embrace the upper curved closed end of the vertical passage-way 16.

Pivoted at 32 upon a wire or other support attached to the upright member 14 is a platform 33, which, when the vessel is in place, projects through the opening 28 therein, as shown. To the front end of said platform is connected a forked wire frame 34, which surrounds the passage-way 16 and which terminates in an arm 35, to which is connected the upper end of a rod or link 36, whose lower end is pivotally connected to the upper end of a door or gate 37, which slides in grooves or ways 38 in the front side of the box.

The door is held normally up or open by means of an arm or catch 39, rising from the front end of a plate or lever 40, which is pivoted at 41 in the side pieces 9 of the box. The front side of the plate or lever may be provided with a weight 42, or may be otherwise constructed to render it heavier than the side in rear of the pivot 41, so that said plate or lever will stand normally in the position shown and tend to hold the door up or open, the lower edge of the door resting upon the upper edge of the catch or prop 39, which is beveled or rounded at 43 and 44, forming an intermediate angle or seat for the door. The lower rounded or beveled edge facilitates the releasement of the door when the catch is vibrated inwardly, and the upper rounded or beveled edge facilitates the seating or propping of the door. The ascent of the door may be limited by a stop, as 45, which may be placed at any desired point.

One or both of the bait-chambers having been supplied with some suitable substance 13, as bread or meat, and the door 37 lifted, so that the catch 39 may drop forward and support it, and the vessel 29 having been supplied with water and placed in position, the trap is in readiness for use.

In operation, as soon as the mouse enters the doorway and steps upon the inner end of the pivoted plate or lever the weight of the animal causes said plate or lever to vibrate and the catch to swing inwardly and thereby release the door, which by gravity descends at once and closes the doorway, thus preventing any return exit of the mouse. As the door descends, the platform 33 is lifted by the connections described to a substantially horizontal position. As the only outlet now from the box is through the vertical passage-way 16, the mouse will ascend therethrough past the vibratory pronged plate and pass through the opening 15 and the opening 28 down onto the platform 33, which, under the weight of the animal, will descend and precipitate it into the water below. During the descent of the platform the door 37 is raised and the catch automatically vibrated outwardly to a position to support the door in its raised position. Thus through the means described the animal first closes the door after itself, and then, when it is too late for it to recede, opens the door again for a succeeding animal.

It will be observed that the bait-chambers are inaccessible to the mouse, either from the outside or inside of the box, and hence the bait is never eaten and may be used indefinitely. I prefer to construct the sides of the bait-chamber of wire, as shown, although the inner side wall of the bait-chamber (which is also the inner wall of the box) may be made of other material than wire. I also prefer to construct the upright passage-way 16 of wire to afford as much light as possible to the opening 15, as thereby the mouse is apparently led to believe that there is a means of escape thereat. I have used a trap constructed in the manner shown and described and have observed that almost immediately the door closes the mouse becomes frightened and runs up the vertical passage-way through the opening 15 out upon the platform 33. After the mouse has been drowned the vessel may be detached and the contents readily emptied by swinging the cover back upon its hinge, all of which may be accomplished without even seeing the drowned mouse, which, to some persons, is a very unpleasant sight. The vessel may be either lifted bodily in its detaching movement or may be slid rearwardly from its support or fastening.

In so far as the main feature of my invention is concerned, the lateral or exterior bait-chambers may be omitted and the bait placed directly within the box, although I prefer the construction shown.

Many changes in shape or form and details of construction may be readily made without departing from the spirit of my invention, the gist of which has already been referred to and will now be embodied in the following claims.

What I claim as new, and desire to secure by Letters Patent, is—

1. In a trap, the combination of an entrance-chamber having a door, and a tank having a pivoted platform, said platform being provided with an extension, to which said door is permanently hung so that the door and platform always move together; as set forth.

2. In a trap, the combination of an entrance-chamber provided with a door, a detachable tank, and a platform pivoted to the body of the trap and projecting into said tank in a manner such as to leave the tank free for detachment, said platform being permanently connected to said door and adapted to lift said door by the overbalancing weight of the animal therein; as set forth.

3. In a trap, the combination of an entrance-chamber having a door, and the lever plate 40 provided with the catch-arm 39, a detachable tank having an opening 28, and a platform projecting through said opening into the tank and arranged to operate said door, yet permitting the ready detachment of the tank; as set forth.

4. In a trap, the combination of an entrance-chamber having a door, a passage-way, and a detachable tank provided with an opening, 28, in the side wall thereof and a platform connected to said door; the said passage-way being arranged between the entrance-chamber and the detachable tank and directly connecting the two; as set forth.

5. In a trap, the combination of an entrance-chamber, a vertical passage-way, a detachable tank provided with an opening, 28, arranged coincidently with an opening, 15, in said passage-way, a door at said entrance-chamber, an elevated platform in said tank, and means for attaching one to the other; as set forth.

6. In a trap, in combination with a box or compartment having wire sides, a lateral bait-chamber having a wire door, and a vertically-sliding door, of a pivoted plate or lever within said box or compartment and carrying a catch to hold said door normally open and adapted when borne upon by the animal to vibrate said catch inwardly and permit the descent of the door, substantially as set forth.

Signed at New York, in the county of New York and State of New York, this 17th day of January, A. D. 1895.

MAX AVRAMOVITZ.

Witnesses:
    JACOB FELBEL,
    I. C. MACDONALD.